Sept. 5, 1933.   T. R. RHEA ET AL   1,925,881
MOTOR CONTROL SYSTEM
Filed Dec. 30, 1931   2 Sheets-Sheet 1
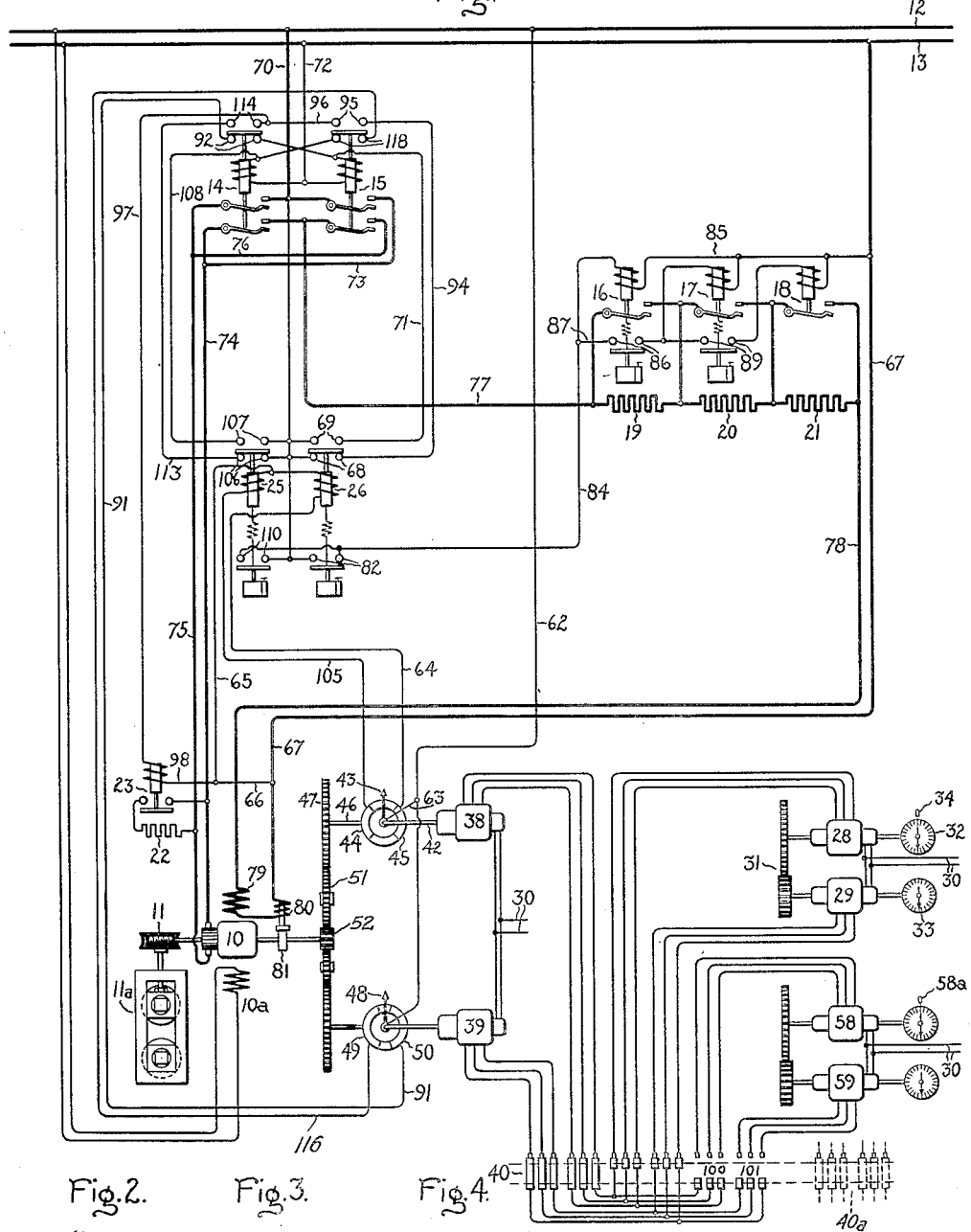
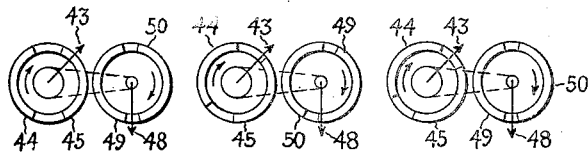
Inventor:
Thomas R. Rhea,
William B. Snyder,
by
His Attorney.

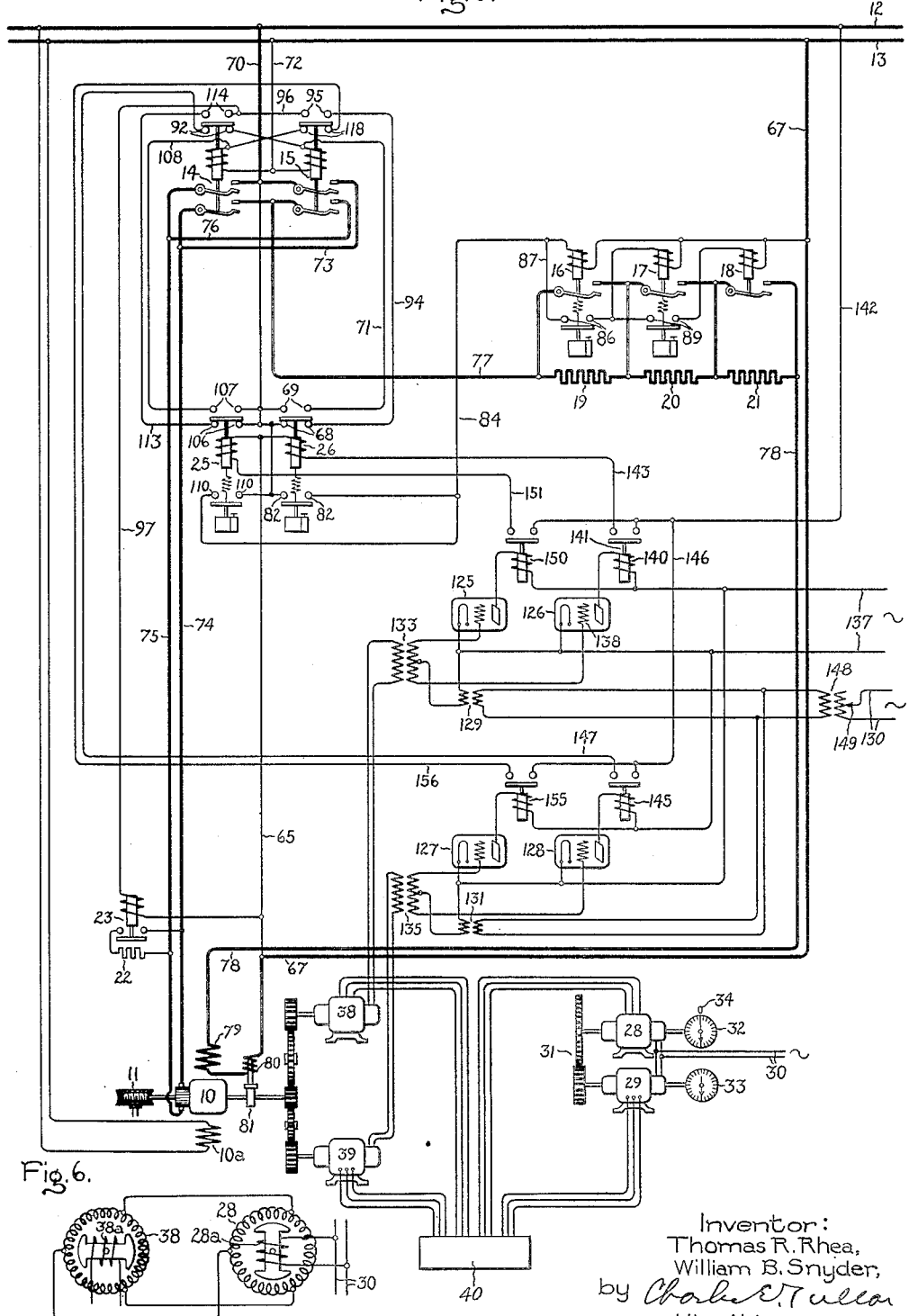

Patented Sept. 5, 1933

1,925,881

UNITED STATES PATENT OFFICE 1,925,881

MOTOR CONTROL SYSTEM

Thomas R. Rhea and William B. Snyder, Schenectady, N. Y., assignors to General Electric Company, a corporation of New York Application December 30, 1931
Serial No. 583,928

18 Claims. (Cl. 80—56)

Our invention relates to a control system for an electric motor arranged to be rotated successively to a plurality of predetermined positions, and has for its object the provision of a simple, accurate and reliable control of the motor.

Our invention is particularly useful in connection with rolling mills, wherein a billet or slab of steel is arranged to be repeatedly passed through the mill until the slab or billet has been rolled down to the required size. This has generally been accomplished by running a slab through the mill with the opening between the rollers adjusted so that they will operate to reduce the size of the slab a predetermined amount. For example, for successive passes, the rolls might be brought together an inch at a time so that the thickness is reduced approximately an inch for each pass. It is desirable, when a large quantity of material is to be rolled in the same way, to provide for the automatic adjustment of the rolls for each successive pass.

In carrying out our invention in one form thereof, we provide for variable speed control of the screw-down motor, the speed of the motor at a given time being dependent upon the correspondence of the roll position with a selected roll setting. More specifically we provide a plurality of positioning means, each of which has a coarse control and a vernier control for the screw-down motor so that the motor may be operated by the coarse control of a selected one of the positioning means at high speed to drive the roll to a predetermined distance from a desired setting; the vernier control thereafter functioning to decelerate the motor and to cause the motor to operate at low speed to drive the roll to its predetermined position thereby insuring great accuracy in the positioning of the roll.

For a more complete understanding of our invention reference should be had to the drawings in which Fig. 1 diagrammatically illustrates a control system embodying our invention, Figs. 2, 3 and 4 are detail views explanatory of the operation of the system shown in Fig. 1, Fig. 5 diagrammatically illustrates a preferred form of a control system embodying our invention, and Fig. 6 diagrammatically illustrates the normal positions of the motion transmitting and receiving devices.

Referring to Fig. 1, we have shown our invention in one form as applied to the control of a motor 10 arranged to drive through the gears 11 the lowering and elevating mechanism of one roll of a rolling mill 11a or the like. A separately excited field winding 10a provides excitation for the motor while the armature of the motor 10 is arranged to be selectively energized from the direct current supply lines 12 and 13 by means of the up-direction switch 14 and the down-direction switch 15. The accelerating contactors 16, 17 and 18 serve to accelerate the motor 10 to its full speed in either direction of rotation. For slow speed operation, in addition to the accelerating resistors 19, 20 and 21, the resistance 22 is arranged to be connected in shunt with the armature of the motor 10 by a contactor 23. A pair of relays 25 and 26 are arranged to selectively control the energization of the direction switches 14 and 15. The extent to which the screw-down motor 10 is to be rotated is determined by a coarse master motion transmitting device 28 and a fine or vernier motion transmitting device 29. Motion transmitting devices of the type shown are now being marketed under the trade name "Selsyn", and are described in U. S. Patent No. 1,637,039, E. M. Hewlett et al., dated July 26, 1927, and in this description will be briefly described by saying that each of these devices is provided with a poly-circuit stator winding and with a rotor having a single circuit field winding. The rotor windings are arranged to be energized from a suitable source of alternating current supply as indicated by the supply lines 30. The rotors of these devices are geared together by means of the gearing 31, which gearing has a high ratio of the order of 20 to 1. The provision of this high gear ratio insures a greater accuracy of control of the motor 10. The dials 32 and 33 indicate at all times the positions of the rotors of these devices and it will be obvious that by turning the crank 34 any desired position may be selected for the motion transmitting devices. A second pair of motion receiving devices 38 and 39 exactly similar in construction to the motion transmitting devices 28 and 29 are arranged to control the energization of the motor 10. The rotor windings of the receiving devices 38 and 39 are energized from a suitable source of alternating current supply as indicated by the supply lines 30. The poly-circuit winding on the coarse motion receiving device 38 is arranged to be connected by a master switch 40 to the poly-circuit winding provided on the master motion transmitting device 28. Similarly, the poly-circuit winding of the fine or vernier motion receiving device 39 is arranged to be connected at the same time by the master switch 40 to the poly-circuit winding provided on the fine or vernier motion sending device 29. In order to control the energization of the motor 10 the receiving devices are connected to drive suitable control means for the motor, this control means being shown as substantially of the type disclosed in Patent No. 1,559,524 to Hewlett et al. Mounted on an extension 42 of the rotor shaft of the coarse receiving device 38 is a conducting member 43 arranged to selectively complete energizing circuits through the conducting segments 44 and 45, which segments are arranged to be rotated by the shaft 46 of the gear 47. Similarly, the rotor of the vernier motion receiving device 39 is arranged to actuate a conducting member 48 arranged to engage selectively the conducting segments 49 and 50 so as to control the energization of the screw-down motor 10 for slow speed operation. The ratio between the gears driving the conducting segments 44 and 45 and the gears driving the conducting segments 49 and 50 is the same as the gear ratio between the coarse and vernier motion sending devices 28 and 29. In addition to having the gear ratios the same, the gears 47, 51 and 52 are selected so that the conducting member 43 is rotated through an angle substantially equal to the angle occupied by the conducting segments 44 or 45 when the roll opening changes from its minimum to its maximum opening.

A second pair of motion transmitting devices 58 and 59 exactly the same in construction and operation as the devices 28 and 29 are arranged to be connected to the motion receiving devices 38 and 39, by means of the master switch 40, as the motion transmitting devices 28 and 29 are disconnected.

With the above understanding of the elements included in this embodiment of our invention, the operation of the system itself and the manner in which the motion transmitting devices 28—29 and 58—59 cooperating with the motion receiving devices 38 and 39 accurately controls the operation of the motor 10 will be readily understood from the description which follows:

It will be assumed that the supply lines are suitably energized and that the opening between the rolls of the rolling mill is greater than is desired for the first rolling operation on a length of material or stock. The crank 34 will thereupon be rotated until the pointers are adjusted with respect to the calibrated dials 32 and 33, to a desired opening for the rolls. As is well understood in the art, when the stator windings are connected together the rotation of the rotor member of the motion transmitting device 28 causes the rotor of the motion receiving device 38 to be rotated in the same direction a corresponding amount. Consequently the conducting member 43 will be rotated a corresponding amount. For the sake of clarity of description, it will be assumed that for a desired adjustment, the conducting member 43 is rotated in a clockwise direction through an angle of 45 degrees. Inasmuch as the vernier motion transmitting device 29 is geared to the coarse motion transmitting device 28 the vernier device is rotated through an angle, the magnitude of which depends on the ratio of the gearing 31 connecting them.

It will be observed that as soon as the conducting member 43 is rotated into engagement with the conducting segment 45 an energizing circuit is completed for the relay 26. This circuit may be traced from the supply lines 12 by conductors 62 and 63, conducting member 43, conducting segment 45, conductor 64, operating coil of relay 26 and by conductors 65, 66 and 67 to the other supply line 13. This relay thereupon operates to open its normally closed contacts 68 and to close its normally open contacts 69, the latter contacts serving to complete an energizing circuit for the down-direction switch 15. This circuit may be traced from the supply line 12 by conductor 70, contacts 69, conductor 71, operating coil of the direction switch 15 and by conductor 72 to the other supply line 13. The direction switch 15 is thereupon operated to its closed position to energize the motor 10 through a circuit which may be traced from the supply line 12 by conductor 70, upper contact of direction switch 15, conductors 73 and 74, armature of motor 10, conductors 75 and 76, lower contacts of direction switch 15, conductor 77, accelerating resistances 19, 20, 21, conductor 78, series field 79 provided on the motor 10, operating coil 80, of the brake 81, and by conductor 67 to the other supply line 13. The motor 10 thereupon rotates at low speed in a direction to decrease the opening between the rollers.

After a short interval of time, the time delay contacts 82 operated with the relay 26 are closed to energize the first accelerating contactor 16. This circuit may be traced from the supply line 12 by conductor 70, time delay contacts 82, conductor 84, operating coil of the first accelerating contactor 16, and by conductors 85 and 67 to the other supply line 13. The accelerating contactor 16 thereupon operates to its closed position to short circuit the first accelerating resistor 19 from the armature circuit of the motor 10. After a short interval of time the time delay contacts 86 operated with the accelerating contactor 16 are closed to complete an energizing circuit for the second accelerating contactor 17. This circuit may be traced from the supply line 12 by conductor 70, contacts 82, conductors 84 and 87, contacts 86, operating coil of contactor 17, and by conductors 85 and 67 to the other supply line 13. A short interval of time after the contactor 17 has short circuited the second accelerating resistor 20 the time delay contacts 89 operated with the contactor 17 are closed to complete an energizing circuit for the third accelerating contactor 18. This circuit may be traced as before from the supply line 12 by conductor 70, contacts 82, conductors 84 and 87, contacts 86, contacts 89, operating coil of contactor 18, and by conductors 85 and 67 to the other supply line 13. The third accelerating contactor 18 is thereupon operated to short circuit the third accelerating resistor 21 from the armature circuit of the motor 10. The motor 10 now accelerates to its full speed and continues to operate at full speed until the conducting segment 45 has been driven by the gear 47 through an angle of 45 degrees. Due to this differential operation the conducting member 43 will then occupy a position between the conducting segments 44 and 45. As soon as the conducting member 43 interrupts the energizing circuit of the relay 26 this relay immediately operates to open its contacts 69 and to close its contacts 68. The direction switch 15 is not deenergized, however, as a holding circuit is completed for its operating coil by means of the conducting member 48 and the segment 49. This circuit may be traced from the supply line 12 by conductor 62, conducting member 48 of the vernier direction receiving device, conducting segment 50, conductor 91, interlocking contacts 92 of the direction switch 14, operating coil of the direction switch 15, and by conductor 72 to the other supply line 13. It will therefore be observed that the opening of the relay 26 serves to transfer the control of the motor 10 from the coarse motion receiving device 38 to the vernier motion receiving device 39.

The manner in which the control of the motor 10 is shifted from the coarse motion receiving device to the vernier motion receiving device 39, will be clearly seen by referring to Figs. 2, 3 and 4. In Fig. 2, the conducting member 43 of the coarse motion receiving device 38 is shown at an angle of forty-five degrees with the vertical while the conducting member 48 of the vernier motion receiving device 39 is shown at an angle of one hundred eighty degrees with the vertical. These two positions represent the positions these conducting members occupy when the crank 34 has been rotated through the forty-five degree angle and the ratio between the motion transmitting device 28 and the motion transmitting device 29 is 20 to 1. In Fig. 3 it will be observed that the conducting segments 44 and 45 have been rotated by the gear 47 until the conducting member 43 no longer engages the conducting segment 45. Due to the gear ratio, however, between the coarse motion receiving device 38 and the vernier receiving device 39, the conducting member 48 of the vernier device 39 is arranged to engage the conducting member 49 as the conducting segment 45 leaves the conducting member 43 so that the holding circuit traced above is completed. In Fig. 4 the relative positions of the conducting segments with their respective conducting members is shown when both circuits have been interrupted and it will of course be understood that the motor is brought to rest as this condition occurs. It is to be understood that the ratio between each pair of devices need not be of the order of 20 to 1, but may be either more or less, just so long as the conducting member 43 interrupts its circuit just as the conducting member 48 completes its circuit.

Continuing with the operation, it will be observed that as the relay 26 is operated to open the contacts 69 the contacts 68 of this relay are closed to complete an energizing circuit for the contactor 23 which contactor effectuates the low speed operation of the motor 10. This circuit may be traced from the supply line 12 by conductor 70, contacts 68 of the relay 26, conductor 94, contacts 95 operated with the direction switch 15, conductors 96 and 97, operating coil of the contactor 23 and by conductors 98 and 67 to the other supply line 13. This contactor 23 is thereupon operated to its closed position to connect the resistance 22 in shunt with the armature of the motor 10. Inasmuch as the relay 26 in opening its contacts 69 deenergized the accelerating contactors 16, 17 and 18, it will be seen that the inclusion of the resistances 19, 20 and 21 in series with the armature of the motor 10 and the establishment of the shunt connections through the resistance 22 brakes the motor to a very low speed. The motor 10 continues its low speed operation, however, and drives the roll to the position determined by the setting of the motion transmitting devices 28 and 29. As soon as the position is reached substantially as illustrated in Fig. 4 with the conducting member 48 clearing the conducting segment 49, the energizing circuit of the direction switch 15 is broken. Consequent to the opening of the direction switch the motor is deenergized and the brake 81 set to hold the roll of the rolling mill 11a in position. The adjustment of the roll for the first pass has now been completed. It should here be observed that if it were not for the slow speed operation as the desired position of the roll is accomplished there would be a likelihood that the motor would drive the roll beyond the position desired. However the speed of the motor has been reduced so that as the roll comes into position, any tendency for it to overshoot is substantially eliminated.

While the above operations are being completed it will be understood that the operator may preselect the opening between the rolls for the second pass by rotating the handle 58A of the motion transmitting device 58 until the desired roll opening may be read on the calibrated dials.

As soon as the billet or length of material has passed through the rolls for the first pass the master switch 40 is rotated until its contacts 100 and 101 are in position to connect the three circuit stator winding of the motion transmitting devices 58 and 59 to the three circuit windings of the motion receiving devices 38 and 39. The master switch 40 at the same time serves to disconnect the motion transmitting devices 28 and 29 from the receiving devices 38 and 39. Inasmuch as the position of the rolls for the second pass has already been established by means of the crank 58a, the system again operates in the manner described to bring the rolls into the second position as determined by the motion transmitting devices 58 and 59.

It will of course be obvious that for the operation of many rolling mills or machines of like character, it will be desirable to have more than two positions of the rolls. Therefore, a pair of motion transmitting devices may be provided corresponding to the number of operations required of a rolling mill or the like on a length of material. For example, if the rolling mill is to be successively adjusted for ten operations on a length of material, there will be ten pairs of motion transmitting devices connected to the master switch 40 so that each pair may be successively connected to the motion receiving devices 38 and 39.

Continuing with the operation of our invention, it will be assumed that the rolling operation has been completed for the last setting of the rolls and it is desired to repeat the rolling operation on a second length of material. It is only necessary for the operator to rotate the master switch 40 to connect the motion receiving devices 38 and 39 to the motion transmitting devices 28 and 29. The result is that the rotor member of the receiving device 38 assumes a position in correspondence with the rotor member of the motion transmitting device 28 while the conducting member 43 is rotated in a counter-clockwise direction to establish an energizing circuit for the relay 25. This circuit may be traced from the supply line 12 by conductors 62 and 63 conducting member 43, conducting segment 44, conductor 105, operating coil of the relay 25 and by conductors 65, 66 an 67 to the other supply line 13. The relay 25 thereupon operates to open its contacts 106 and to close its contacts 107, thereby completing an energizing circuit for the up-direction switch 14. This circuit may be traced from supply line 12 by conductor 70, contacts 107, conductor 108, operating coil of direction switch 14, and by conductor 72 to the other supply line 13. The direction switch 14 thereupon operates to energize the motor 10 for rotation in a direction to increase the distance between the rolls of the rolling mill 11a. After a predetermined time interval the time delay contacts 110 operated with the relay 25 are closed to complete an energizing circuit for the accelerating contactor 16. This circuit may be traced from supply line 12 by conductor 70, contacts 110 of the relay 25, conductor 84, operating coil of contactor 16, and by conductors 85 and 67 to the other supply line 13. It will be understood that the contactors 17 and 18 are successively operated as before so as to accelerate the motor 10 to its full speed. As before described, the motor 10 rotates to cause the conducting segments 44 and 45 to follow the conducting member 43 until the neutral position has been attained and the conducting member 43 leaves the conducting segment 44 to deenergize the relay 25. The accelerating contactors 16, 17 and 18 are simultaneously deenergized to connect the accelerating resistors 19, 20 and 21 in the armature circuit of the motor 10.

As the contacts 107 of the relay 25 were opened, its contacts 106 were closed to complete a holding circuit for the direction switch 14 inasmuch as the vernier motion receiving device 39 has now been operated so that the conducting member 48 is in engagement with conducting segment 49. This circuit may be traced from the supply line 12, by conductor 62, conducting member 48, conducting segment 49, conductor 116, interlock contacts 118 of the direction switch 15, operating coil of the direction switch 14 and by conductor 72 to the other supply line 13. The closing of the contacts 106 of the relay 25 serves to establish an energizing circuit for the contactor 23. This circuit may be traced from the supply line 12 by conductor 70, contacts 106 of the relay 25, conductor 113, contacts 114 closed with the direction switch 14, conductor 97, operating coil of the contactor 23 and by conductors 66 and 67 to the other supply line 13. The contactor 23 is thereupon operated to its closed position to connect the resistance 22 in shunt with the armature of the motor 10 thereby increasing its rate of deceleration. After the motor 10 has decelerated to a very low speed it continues to operate at this low speed until the conducting segment 50 disengages itself from the conducting member 48 thereby interrupting the energizing circuit to the direction switch 14. As soon as this occurs the direction switch is operated to its open position thereby deenergizing the motor 10 and as before the series brake immediately sets to hold securely the motor at a standstill with the rolls in readiness for the first pass.

Now that the principles of our invention have been explained further variations of their embodiment will suggest themselves to those skilled in the art. For example, it is sometimes desirable to simultaneously reduce the length and breadth of a material by employing vertical rolls as well as the horizontal rolls. For this application, we have shown by broken lines additional contacts 40a on the master switch 40. A control system such as that shown in Fig. 1 is used to control the opening between the vertical rolls. A plurality of pairs of motion transmitting devices are utilized for the selection of a plurality of positions for the vertical rolls. Both control systems are jointly controlled by the master switch 40 so that after a pass has been completed and the master switch has been operated, the vertical and horizontal rolls are simultaneously adjusted so as to be in readiness for the next pass. Inasmuch as a driving motor is energized for rotation as determined by the position of the rolls with respect to a desired setting of the positioning means, it will be seen that any prearranged program of operation may be predetermined regardless of whether the operation causes a motor to reverse or to continue to operate in a given direction.

Referring now to Fig. 5 we have shown our invention applied in an improved form to the control of the screw-down motor 10. As before the energization of this motor is controlled by the direction switches 14 and 15 in conjunction with the relays 25 and 26. The accelerating contactors 16, 17 and 18 serve as before to control the acceleration of the motor 10. For slow speed operation the contactor 23 functions as described in connection with Fig. 1 to connect the resistor 22 in shunt with the armature of the motor 10.

For the purposes of simplifying the drawings the details of the master switch 40 have been omitted. As shown the master switch 40 serves to connect the poly-circuit winding of the motion transmitting device 28 to the poly-circuit winding of the motion receiving device 38. Similarly, the poly-circuit winding of the motion transmitting device 29 is connected to the poly-circuit winding of the motion receiving device 39. It is to be understood, however, that there will be provided pairs of motion transmitting devices corresponding in number to the number of passes required to complete the rolling of the material.

In this modification of our invention the electric valves 125, 126, 127 and 128 are employed to control the energization of the motor 10 so that it will operate to position accurately the rolls. Electric valves of any of the several types well known in the art may be employed, though we have found that electric valves of the vapor electric discharge type are particularly suitable for controlling the energization of the motor 10. Each valve is provided with an anode, a cathode, and a control grid. A negative grid voltage is applied to each control grid so that each grid is normally negative with respect to its anode. A transformer 129 energized from the alternating current supply line 130 serves this purpose for the valves 125 and 126. Similarly, a transformer 131 also energized from the alternating current supply line 130 is arranged to maintain a negative grid bias on the control grids of the valves 127 and 128. A grid transformer 133 has its primary winding connected to the rotor winding of the motion receiving device 38, while the secondary winding is connected respectively to the control grids of the electric valves 125 and 126. Similarly, a grid transformer 135 has its primary connected to the rotor winding of the vernier motion receiving device 39, while its secondary is connected respectively to the control grids of the electric valves 127 and 128.

Broadly the manner in which the conductivity of the electric valves is controlled forms no part of the present invention as it is described and claimed in U. S. Reissue Patent 16,667, Hewlett et al, assigned to the same assignee as the present invention.

Referring now to Fig. 6 we have shown the rotor winding 28a of the coarse motion transmitting device 28 at right angles to the rotor winding 38a of the motion receiving device 38. As long as these rotor windings are at right angles to each other no induced voltage will appear across the winding 38a of the motion receiving device 38. Therefore the grid bias supplied by the grid bias transformers 129 and 131 will maintain the electric valves 125, 126, 127 and 128 nonconductive.

If it be assumed, however, that the crank 34 is rotated with respect to the calibrated dial until the desired position which the rolls should occupy is indicated, it will be seen at once that the rotor winding 28a will assume a definite angular relation with respect to the rotor winding 38a of the motion receiving device 38. The result is that a voltage will appear across the primary of the grid transformer 133. It will be further assumed that the crank 34 has been rotated in a clockwise direction through forty-five degrees for a desired setting of the rolls and that for this setting the rolls are to be moved in a direction to decrease the distance between them. The transformer 133 is connected so that when the anode voltage supplied from the alternating current supply line 137 is positive voltage produced by the rotor winding 38A of the motion receiving device 38 supplies a positive potential to the control grid 138 of the electric valve 126. As is well understood in the art the valve 126 is thereby rendered conductive to complete an energizing circuit for the operating coil 140 of the relay 141. This relay immediately operates to close its contacts thereby energizing the operating coil of the relay 26 through a circuit which may be traced from the supply line 12 by conductor 142, contacts of the relay 141, conductor 143, operating coil of relay 26, and by conductors 65 and 67 to the other supply line 13. The relay 26 thereupon operates to open its contacts 68 and to close its contacts 69, the latter of which contacts complete an energizing circuit for the direction switch 15. The direction switch 15 is thereupon operated to its closed position to energize the motor 10 in a direction to decrease the distance between the rolls. Time delay contacts 82 close after a predetermined time interval to complete an energizing circuit for the accelerating contactor 16. Thereafter the accelerating contactors 17 and 18 are successively operated to further accelerate the motor in the manner described in connection with Fig. 1.

The ratio of gearing between the coarse motion receiving device 38 and the vernier motion receiving device 39 serves the same purposes as described in connection with Fig. 1. In this modification, however, a substantial voltage is produced by the rotor winding of the vernier motion receiving device 39 just as the voltage produced by the rotor winding of the motion receiving device 38 has been decreased to a substantially low value. The decrease in voltage is caused by the differential drive produced by the movement of the rotor 38A in a clockwise direction as the motor 10 adjusts the roll in the desired direction.

The grid transformer 135 is connected so that the voltage appearing on the rotor winding of the motion receiving device 39 will produce a positive potential on the control grid of the electric valve 128 as its anode voltage is made positive. The valve thereby becomes conductive to complete an energizing circuit for a relay 145. The relay 145 thereupon operates to close its contacts to complete a holding circuit for the direction switch 15. This circuit may be traced from the supply line 12 by conductors 142, 146, contacts of the relay 145, conductor 147, interlock contacts 92 of the direction switch 14, operating coil of the direction switch 15, and by conductor 72 to the other supply line 13. Therefore, as soon as the valve 126 is rendered non-conductive by the decrease in the potential applied to the control grid 138 and the reduction of the anode voltage, the relay 140 is operated to open its contacts.

The holding circuit, however, maintains the direction switch 15 energized so that the relay 26 operates to open its contacts 69 and to close its contacts 68. As in the case of the modification shown in Fig. 1, the accelerating contactors 16, 17 and 18 are deenergized and a circuit is completed for the contactor 23 so that the resistor 22 is connected in shunt to the armature of the motor 10. This motor is thereby caused to rotate at very low speed to bring the rolls slowly into positional agreement with the setting on the dial.

As soon as the motor 10 has driven the rotor of the motion receiving device 39 through forty-five degrees, the rotor of this device will be at right angles with the rotor of the motion transmitting device 29 so that the grid voltage applied to the control grid of the electric valve 128 disappears. As soon as the anode voltage is reduced sufficiently the electric valve 128 becomes non-conducting and the relay 145 is operated to its open position to deenergize the direction switch 15. The brake 81 again sets to hold the rolls in their predetermined position.

It will be seen that in this modification of our invention no sliding contacts are employed, the balancing of the grid bias voltage with the grid control voltage produced by the motion receiving devices 38 and 39 serving the function of the sliding contacts. A greater accuracy of position is obtained because the friction incident to the use of the contacts is eliminated. Furthermore the neutral points, corresponding to open circuit conditions of the contacts operated by the motion receiving devices, are readily adjustable. This adjustment is made by varying the bias voltage applied to the grids of the valves. As shown this is accomplished by the provision of a transformer 148 the active turns of the primary winding being under the control of the tap changing switch 149. If the grid bias is relatively large, the motion receiving devices in order to render the valves conductive must be rotated until a sufficient voltage is applied to the grid transformer to overcome this bias voltage.

Continuing with the operation if it is desired to increase the opening between the rolls it will be understood that the crank 34 will be operated in a counterclockwise direction until the new setting of the rolls may be read from the calibrated dials. The result is that a voltage will be produced by the rotor winding 38A in a direction to cause a positive potential to be applied to the control grid of the electric valve 125. This valve is thereby rendered conductive to complete an energizing circuit for the relay 150 which relay is operated to its closed position to complete an energizing circuit for the relay 25. This circuit may be traced from the supply line 12 by conductor 142, contacts of the relay 150, conductor 151, operating coil of the relay 25, and by conductors 65 and 67 to the other supply line 13. As described in connection with Fig. 1, the relay 25 thereupon operates to close its contacts 107 and to open its contacts 106. Consequent to the closing of the contacts 107 the direction switch 14 is closed to energize the motor 10 in a direction to increase the opening between the rolls. The accelerating contactors 16, 17 and 18 are successively operated to accelerate the motor to its full speed. The differential action produced by gearing the rotor of the motion receiving device 39 to the motor 10 again serves to cause the rotors of these two devices to be moved through an angle corresponding to that which the coarse and vernier motion transmitting devices 28 and 29 were moved through. As soon as the coarse motion receiving device 38 is moved through this angle, the potential applied to the control grid of the electric valve 125 is again reduced and as soon as the anode voltage decreases a predetermined amount the valve becomes non-conductive and the relay 150 is operated to its open position. As indicated in the first operation, however, the motion receiving device 39 at the same time applies a potential from the control grid of the electric valve 127 in a direction to render this valve conductive so that the relay 155 is operated to its closed position. This circuit may be traced from the supply line 12 by conductors 142 and 146, contacts of the relay 155, conductor 156, interlock contacts 118 on the direction switch 15, operating coil of the direction switch 14 and by conductor 72 to the other supply line 13. The direction switch 14 is thereby maintained closed by reason of the holding circuit. The motor 10 is again slowed down to a low speed due to the opening of the accelerating contactors 16, 17 and 18 and by the closing of the contactor 23 which serves to connect the resistance 22 in shunt with the armature of the motor 10.

While we have shown particular embodiments of our invention it will be understood of course that we do not wish to be limited thereto, since many modifications may be made and we therefore contemplate by the appended claims to cover any such modifications as fall within the true spirit and scope of our invention.

What we claim as new and desire to secure by Letters Patent of the United States is:

1. A material modifying apparatus having an operating element movable to an infinite number of positions between predetermined limits comprising a motor for varying the position of said element, an electrical motion transmitting device having an infinite number of operating positions for selecting a desired one of said positions and an electrical motion receiving device differentially responsive to the operation of said transmitting device and said motor for controlling the energization of said motor to operate said element to said selected position.

2. In a control system, the combination with a pair of rolls one of which is adjustable with respect to the other to an infinite number of positions between predetermined limits, of a motor for adjusting the relative positions of said rolls, an electrical motion transmitting device for selecting a desired one of said positions, an electrical motion receiving device, electrical connections for connecting said receiving device to said transmitting device, mechanical connections for connecting said receiving device to said motor, and means responsive to said motion receiving device for controlling the energization of said motor to adjust the relative positions of said rolls to said selected position.

3. In combination with a material modifying apparatus, of a reversible electric motor, means for controlling the energization of said motor for forward and reverse operation, a plurality of pairs of high and low speed positioning means each of which is continuously variable independently of said control means for predetermining the direction and extent of the operation of said motor to an infinite number of positions, and switching means for selectively connecting each pair of said positioning means to said control means so as to effectuate the operation of said motor to a selected predetermined position.

4. A system for operating an object to a plurality of selected positions, comprising a reversible driving motor, a plurality of pairs of motion transmitting devices separately movable to a plurality of selected positions, a pair of motion receiving devices differentially responsive to said motor and to a selected pair of said transmitting devices, means for electrically connecting a selected pair of said transmitting devices to said receiving devices, means responsive to one of said motion receiving devices for operating said motor at high speed, and means responsive to the other of said motion receiving devices for operating said motor at low speed so that said object is quickly and accurately driven into positional agreement with a selected pair of said motion transmitting devices.

5. In a system for predetermining the positioning of a plurality of rolls at least one of which is adjustable, comprising a motor arranged to vary the opening between said rolls, a plurality of pairs of adjustable motion transmitting devices upon each pair of which a roll position may be selected, a single pair of motion receiving devices differentially responsive to said motor and to a selected pair of said motion transmitting devices, means responsive to one of said motion receiving devices for operating said motor at high speed, and means responsive to the other motion receiving device for operating said motor at low speed, and means for electrically connecting a selected pair of said transmitting devices to said receiving devices.

6. A system for predetermining the opening between a pair of rolls, comprising a motor operatively connected to said rolls, coarse and vernier motion transmitting devices for preselecting a desired pass opening, coarse and vernier motion receiving devices differentially responsive to the operation of said transmitting devices and said motor for controlling the energization of said motor, means responsive to said coarse receiving device for operating said motor at high speed, and means responsive to motor at high speed, and means responsive said motor at low speed so that said rolls are quickly moved to approximately said selected position and are thereafter driven at low speed to said selected opening, and means for braking said motor to a standstill as said rolls are driven to a position corresponding to said preselected opening.

7. The combination, with a rolling mill, of a reversible motor for varying the opening between the rolls of said mill, a plurality of pairs of motion transmitting devices, a pair of motion receiving devices differentially responsive to a selected pair of said transmitting devices and to the operation of said motor, one of said motion receiving devices being arranged to control the energization of said motor for operation at high speed and the other of said motion receiving devices being arranged to control the energization of said motor for operation at low speed, a master switch for electrically connecting a selected pair of said transmitting devices to said receiving devices so that a plurality of roll openings may be preset on said transmitting devices and the motor energized to operate successively said rolls into positional agreement with said predetermined openings.

8. The combination with an electric motor, of a pair of motion transmitting devices, a pair of motion receiving devices, means for driving each of said receiving devices by said motor, means for connecting said sending devices together in the same ratio as said receiving devices are connected together, means for electrically connecting a corresponding transmitting device to a corresponding receiving device, so that said receiving devices are electrically differentially responsive to said transmitting devices and to the operation of said motor, a pair of electric valves respectively arranged to control the energization of said motor for one direction of rotation, means for biasing the control grids of said valves so as to render said valves nonconductive, and means responsive to one of said receiving devices for rendering one of said valves conductive so as to energize the motor for high speed operation, and means responsive to the other of said receiving devices for rendering said other valve conductive thereby energizing said motor for low speed operation so that said motor is operated first at high speed until correspondence with said predetermined setting is approached and thereafter operated at low speed until exact correspondence with said predetermined setting is obtained.

9. The combination, with a rolling mill of a reversible motor for varying the opening between the rolls of said mill, a plurality of pairs of motion transmitting devices, a pair of motion receiving devices differentially responsive to a selected pair of said transmitting devices and to the operation of said motor, a master switch for electrically connecting a selected pair of said transmitting devices to said receiving devices, so that a plurality of roll openings may be preset on said transmitting devices, a pair of electric valves respectively arranged to control the energization of said motor for high and low speed operation in one direction, and a pair of electric valves arranged respectively to control the high and low speed operation of said motor in the other direction, and means responsive to the relative positions of said motion receiving devices for selectively rendering said valves conductive so that said motor is operated at high speed until said rolls approach a preselected opening of said rolls, and is thereafter operated at low speed to said preselected opening.

10. In combination with a material modifying apparatus, of a reversible electric motor, a plurality of pairs of high and low speed positioning means each of which is continuously variable for predetermining the direction and extent of the operation of said motor, control means for operating said motor first at high speed under the control of one of said positioning means and then at low speed under the control of the other of said positioning means, and switching means for selectively connecting a pair of said positioning means to said control means.

11. A control system for a reversible electric motor, positioning means movable on either side of a neutral position for predetermining the direction and extent of the operation of said motor, control means for said motor responsive to the operation of said positioning means for controlling the energization of said motor, and means for electrically varying the movement required by said positioning means to effectuate operation of said control means.

12. A control system for an electric motor comprising an electric valve having an anode, a cathode and a control grid for controlling the energization of said motor, positioning means for said motor for controlling the conductivity of said valve, and adjustable means for varying the time of response of said valve to said positioning means.

13. In combination, a rolling mill, positioning means for predetermining the opening between the rolls of said mill, an electric motor arranged to vary the opening between said rolls, an electric valve having an anode, a cathode, and a control grid, for controlling the energization of said motor, connections for electrically connecting said positioning means to said valve so as to render said valve conductive whenever said positioning has been operated a predetermined amount.

14. In combination, a rolling mill, positioning means for predetermining the opening between the rolls of said mill, an electric motor arranged to vary the opening between said rolls, an electric valve having an anode, a cathode, and a control grid, for controlling the energization of said motor, connections for electrically connecting said positioning means to said valve so as to render said valve conductive whenever said positioning has been operated a predetermined amount, and means for adjustably biasing said control grid with a negative potential.

15. In combination with a material modifying apparatus, of more than one object for acting on said material a plurality of pairs of motion transmitting devices for each of said objects upon which devices a plurality of predetermined positions for said objects may be selected, a motor for each of said objects each motor being arranged to control the positioning of said objects, a pair of motion receiving devices for each motor for controlling the energization of the motor for high and low speed operation, and selective switching means for electrically connecting selected pairs of said motion transmitting devices with their corresponding motion receiving devices so that said motors simultaneously operate to bring said objects into positional agreement with said motion transmitting means.

16. A system for predetermining the opening between a pair of rolls comprising a motor for varying the opening between the rolls, coarse and vernier motion transmitting devices for preselecting the desired opening between said rolls, coarse and vernier receiving devices electrically differentially responsive to said transmitting devices and to the operation of said motor, a control circuit arranged to be completed by said coarse receiving device for energizing said motor for high speed operation, a control circuit arranged to be completed by said vernier motion receiving device for energizing said motor for low speed operation, and means for interlocking said control circuits so that said vernier motion receiving device is only effective after said coarse motion receiving device has caused said motor to operate said rolls to approximately said predetermined roll opening.

17. In combination with a material modifying apparatus, a reversible electric motor, means for controlling the energization of said motor for forward and reverse operation, a plurality of positioning means each of which is continuously variable independently of said control means for predetermining the direction and extent of the operation of said motor to an infinite number of positions, and switching means for selectively connecting each of said positioning means to said control means so as to effectuate the operation of said motor to selected predetermined positions.

18. A system for predetermining the positioning of a plurality of rolls at least one of which is adjustable comprising a motor arranged to vary the opening between the rolls, a plurality of adjustable positioning means upon which a plurality of roll positions may be selected, a single motion receiving device differentially responsive to said motor and to a selected one of said motion transmitting devices for controlling the energization of said motor, and switching means for electrically connecting a selected one of said transmitting devices to said receiving devices.

THOMAS R. RHEA.
WILLIAM B. SNYDER.

CERTIFICATE OF CORRECTION.

Patent No. 1,925,881. September 5, 1933.

THOMAS R. RHEA, ET AL.

It is hereby certified that error appears in the printed specification of the above numbered patent requiring correction as follows: Page 6, line 122, claim 6, strike out the words "motor at high speed, and means responsive" and insert instead "said vernier receiving device for operating"; and that the said Letters Patent should be read with this correction there in that the same may conform to the record of the case in the Patent Office.

Signed and sealed this 24th day of October, A. D. 1933.

F. M. Hopkins (Seal) Acting Commissioner of Patents.